United States Patent
McDaid

[19]

[11] Patent Number: 6,016,673
[45] Date of Patent: Jan. 25, 2000

[54] CABLE LOCK AND BRACKET

[75] Inventor: Cornelius McDaid, Dorchester, Mass.

[73] Assignee: Kryptonite Corporation, Canton, Mass.

[21] Appl. No.: 09/161,932

[22] Filed: Sep. 28, 1998

Related U.S. Application Data

[63] Continuation-in-part of application No. 09/020,638, Feb. 9, 1998, abandoned.

[51] Int. Cl.$^7$ ...................................................... B62J 11/00
[52] U.S. Cl. .................................. 70/18; 70/49; 70/233; 224/451; 224/935; 248/314; 248/316.7
[58] Field of Search .................................. 70/14, 18, 30, 70/49, 58, 233; 248/314, 309.1, 316.7, 551–553; 224/441, 451, 935

[56] References Cited

U.S. PATENT DOCUMENTS

| | | | |
|---|---|---|---|
| D. 365,745 | 1/1996 | Brendel | D8/333 |
| 2,471,825 | 6/1949 | Long | 248/314 |
| 3,286,762 | 11/1966 | McIntosh et al. | 248/316.7 X |
| 4,155,231 | 5/1979 | Zane et al. | 70/18 |
| 4,696,447 | 9/1987 | Strecker | 248/314 X |
| 4,736,921 | 4/1988 | Zane et al. | 224/935 X |
| 4,811,577 | 3/1989 | Webster et al. | 70/14 |
| 5,194,717 | 3/1993 | Cowen et al. | 248/309.1 X |
| 5,255,546 | 10/1993 | Saunders et al. | 70/30 X |
| 5,291,765 | 3/1994 | Hoisington | 70/233 |
| 5,405,113 | 4/1995 | Jaw | 70/233 X |
| 5,647,520 | 7/1997 | McDaid | 248/314 X |
| 5,653,365 | 8/1997 | Lee | 70/233 X |
| 5,718,134 | 2/1998 | Chang | 70/18 X |
| 5,761,934 | 6/1998 | Kuo | 70/233 X |

FOREIGN PATENT DOCUMENTS

| | | | |
|---|---|---|---|
| 0440052 | 8/1991 | European Pat. Off. | 70/233 |
| 3913471 | 3/1990 | Germany | 70/233 |
| 2278629 | 12/1994 | United Kingdom | 224/935 |

OTHER PUBLICATIONS

Ming Tay cable and bracket.
Specialized model HardLock Rapper cable and bracket.
Luma Model 7329 cable and bracket.

*Primary Examiner*—Lloyd A. Gall
*Attorney, Agent, or Firm*—Morse & Altman

[57] ABSTRACT

A cable lock and complementary bracket for securely attaching the cable lock to a bicycle frame when not in use. The bracket has an attachment portion that mounts the bracket to a frame strut and a seat with a cavity into which the lock head of the cable lock fits. The cavity is funnel shaped to limit movement between the lock head and bracket. An arm on the bracket includes a tongue that extends into a groove in the lock head to securely retain the lock head in the bracket. The tongue is biased into the groove and is manually removable by bending the arm to allow removal of the lock head from the bracket.

10 Claims, 4 Drawing Sheets

CABLE LOCK AND BRACKET

RELATED APPLICATIONS

The present application is a continuation-in-part application of application Ser. No. 09/020,638, filed on Feb. 9, 1998, abandoned, in the name of Cornelius McDaid and titled CABLE LOCK AND BRACKET.

BACKGROUND OF THE INVENTION

1. Field of the Invention

The present invention relates to cable locks, and, more particularly, to a complementary set including a cable lock and mounting bracket for releasably securing the cable lock to a bicycle frame.

2. The Prior Art

Since the invention of the cable bicycle lock and the continued improvement thereof, ways to hold onto the lock when riding the bicycle have been needed. In recent years, different ways of mounting these locks to the bicycle were developed. One such method includes securely mounting the lock head to the bicycle frame so that it does not move. The cable end is removed, by using the key, from the lock head, wrapped around a stationary object, and inserted back into the lock head. The main disadvantage to this mounting method is that the cable must be long enough to reach from where the lock head is mounted, around the stationary object, and back to the lock head. It also prevents the cable lock from being used for any vehicle or other purpose.

A second method includes using a bracket to removably attach the cable lock to the bicycle. Early versions of these brackets use the cable itself to hold onto the bracket. For example, the cable is unlocked, the free end of the cable is inserted through a hole in the bracket until the lock head is within the bracket, and the cable is locked together. The main disadvantage is that the entire length of the cable has to be snaked through the bracket before it can be locked together.

SUMMARY OF THE INVENTION

An object of the present invention is to provide a cable lock and bracket that can be secured to a vehicle without having to disengage the lock.

The present invention includes a cable lock and a complementary bracket. The cable lock has the typical components, with a lock head and a cable. One end of the cable is permanently anchored to the lock head and the other end is releasably attached to the lock head through an aperture in the lock head. A keyway accepts a key for operating the internal locking mechanism. Alternatively, a set of combination dials operates the locking mechanism.

The bracket has an attachment portion and a seat portion. The attachment mounts the bracket to the frame strut. Exemplary attachments include a unitary embodiment, where a single flap of the bracket extends around the frame strut and is secured, and a clamp embodiment, where the bracket is held to the frame strut by a hose clamp or similar device.

The seat has a cavity into which the lock head fits, where the cable extends through an opening at the bottom. The cavity has a funnel shape to act as a stop limiting the distance that the lock head can go into the cavity. Gravity holds the lock head in the cavity. Preferably, the shape of the lock head and cavity are matched so that the lock head fits snuggly to minimize movement of the lock head within the cavity. A gap in the side of the cavity is wide enough to allow for insertion of the cable into the cavity but not wide enough for the lock head to fit through. A notch in the top edge of the cavity provides a location for the cable end inserted into the aperture. The notch, in combination with the cable, can prevent the lock head from rotating within the cavity.

Optionally, the lock is held in the cavity by a latch so that the bracket may be used in various orientations. The latch includes an arm, the lower end of which acts as a spring to allow the upper end to bend, but that returns the arm to its normal, or latched, position. A knob at the top of the arm allows manual bending of the arm from the latched to an unlatched position. A tongue extends from the side of the arm. When in the latched position, the tongue extends into the cavity and into a groove in the side of the lock head. When manually moved to the unlatched position, the tongue is removed from the groove.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION

Figure 1:
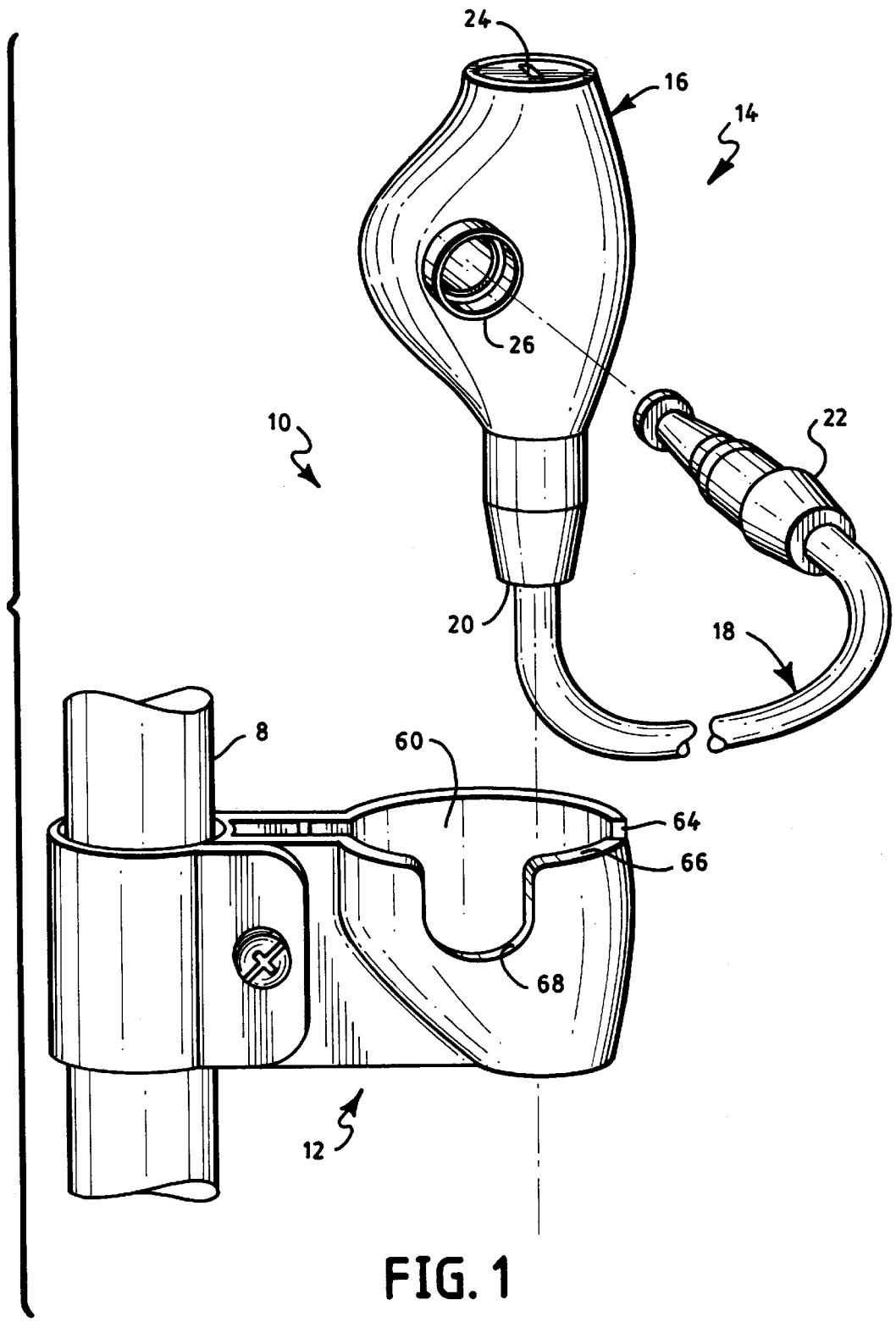
FIG. 1 is a perspective view of the cable lock and bracket of the present invention.
Figure 2:
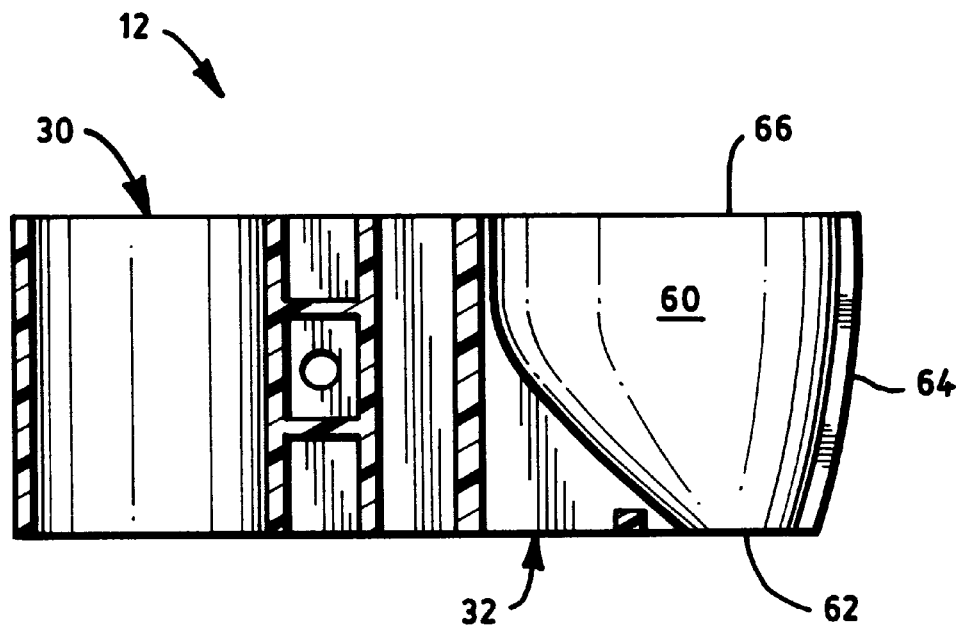
FIG. 2 is a cross-sectional view of the bracket of FIG. 1.

The cable lock/bracket combination 10 of the present invention is shown in FIG. 1 as attaching a cable-type bicycle lock 14 to a strut 8 of a bicycle. The cable lock 14 has a lock head 16 and a cable 18. The cable 18 is permanently attached to the lock head 16 at an anchor end 20 and is releasably attached to the lock head 16 at a free end 22. The lock head 16 includes a keyway 24 that accepts a key for accessing an internal locking mechanism. When closed, the locking mechanism retains the cable free end 22 through an aperture 26 in the side of the lock head 16. When opened by the key, the locking mechanism releases the free end 22, allowing it to be removed from the aperture 26 so the cable 18 may be snaked through the bicycle and a stationary fixture. Alternatively, a set of combination dials, rather than a key, operates the locking mechanism. The cable 18 is typically composed of braided steel encased in vinyl, but the present invention contemplates that any form of cable may be used.

The bracket 12 attaches to a frame strut 8 and has two sections, an attachment 30 and a seat 32. The attachment 30 is adapted to mount the bracket 12 to the frame strut 8. The present invention contemplates using any form of mounting that is adequate for the task, two of which are briefly described below.

Figure 3:
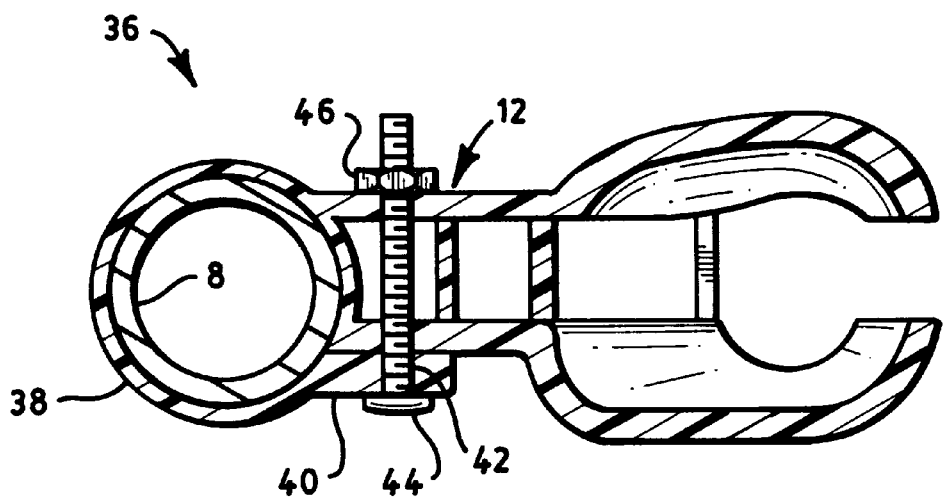
FIG. 3 is a cross-sectional top view of one embodiment of the attachment.
Figure 4:
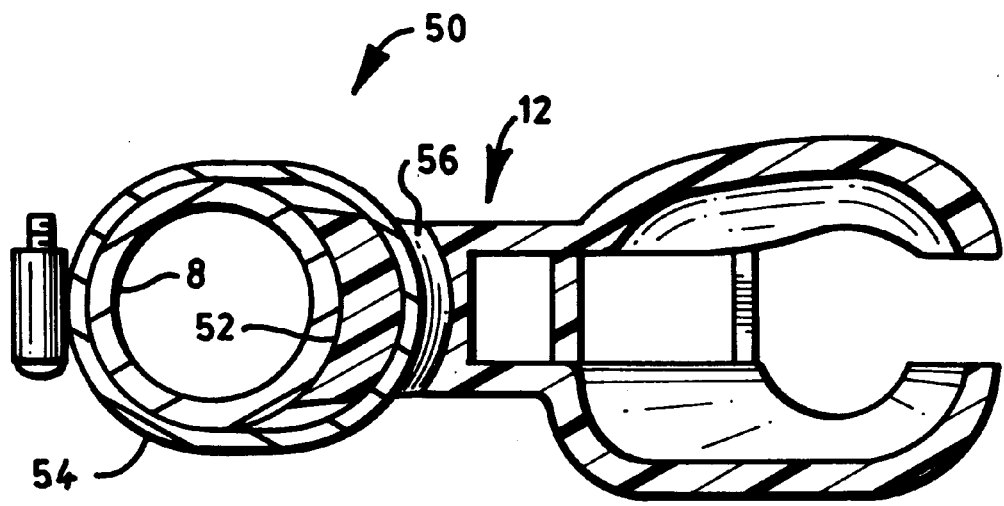
FIG. 4 is a cross-sectional top view of another embodiment of the attachment.

A unitary embodiment 36 of the attachment 30 is shown in FIG. 3. The unitary embodiment 36 consists of a flap 38 that extends from one side of the bracket 12 and wraps around the frame strut 8. The end 40 of the flap 38 has a hole 42 through which a screw 44 extends. The screw 44 is tightened via a nut 46 to secure the bracket 12 to the frame strut 8.

The clamp embodiment 50 of the attachment 30 is shown in FIG. 3. The face 52 of the bracket 12 includes a semi-cylindrical surface. A hose clamp 54 or other similar device extends around the frame strut 8 and through a slot 56 behind the face 52. The clamp 54 is tightened to secure the bracket 12 to the frame strut 8.

At the opposite end of the bracket 12 from the attachment 30 is the seat 32. The seat 32 has a cavity 60, the inner surface of which is shaped somewhat like a funnel. The lock head 16 fits into the cavity 60, where the cable 18 extending from the lock head 16 fits through an opening 62 at the bottom of the cavity 60. Typically, gravity holds the lock head 16 in the cavity 60. The purpose of the funnel shape is to act as a stop limiting the distance that the lock head 16 can go into the cavity 60, thereby preventing the lock head 16 from falling through the cable opening 62. The exact shape of the cavity 60 is not particularly important. The only restrictions are that the lock head 16 can fit into the cavity 60 and that the cable opening 62 is too small for the entire lock head 16 to fit through. Preferably, the shape of the lock head 16 and cavity 60 are matched so that the lock head 16 fits snuggly within the cavity 60. A snug fit minimizes movement of the lock head 16 within the cavity 60.

An improvement over the prior art is a gap 64 in the side of the cavity 60 that allows for insertion of the cable 18 into the cavity 60. Without the gap 64, as in the prior art, the cable 18 would have to be released from the lock head 16 and the free end 22 snaked completely through the cavity 60. The gap 64 provides a much more convenient way to insert the lock head 16 into the cavity 60. The gap 64 should only be wide enough to allow the cable 18 to fit through. It should not be so wide as to compromise the integrity of the bracket 12 or to allow the lock head 16 to fit through.

In the typical cable lock, the aperture 26 into which the free end 22 of the cable 18 is inserted is located on the side of the lock head 16. If the cavity 60 is sized so that the aperture 26 would fall within the cavity 60, a means must be provided to accommodate the cable 18 when the free end 22 is in locked into the aperture 26. A notch 68 in the upper edge 66 of the cavity 60 provides a location for the cable 18.

The notch 68 can also provide a secondary function, which is to prevent the lock head 16 from rotating within the cavity 60. Normally, however, this function is unnecessary if the cavity 60 and lock head are shaped to prevent rotation. For example, in the embodiment of FIG. 1, the lock head has an approximately oval horizontal cross-section, so that it cannot rotate within the cavity 60.

Figure 6:
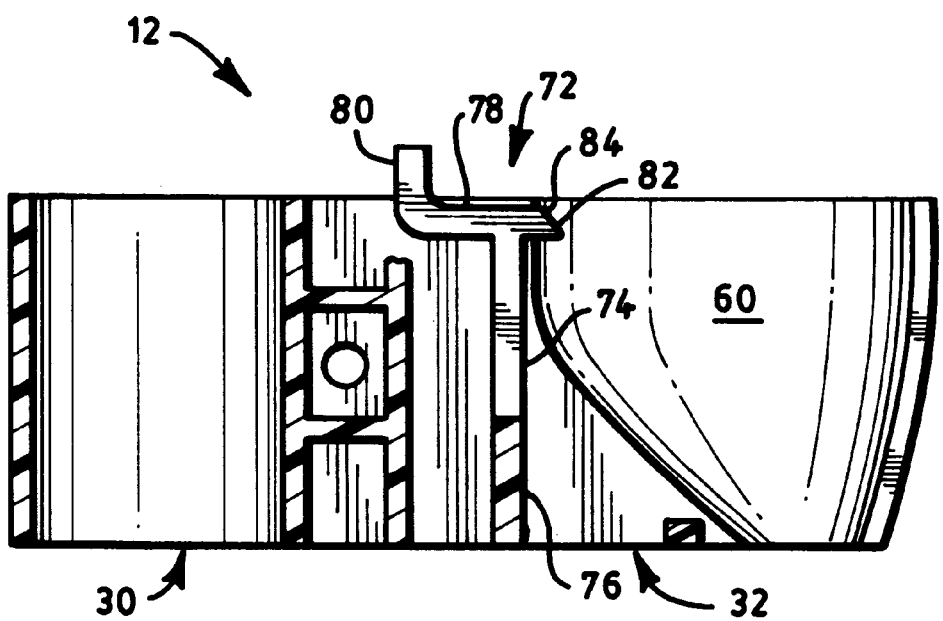
FIG. 6 is a cross-sectional view of the bracket of FIG. 5.
Figure 5:
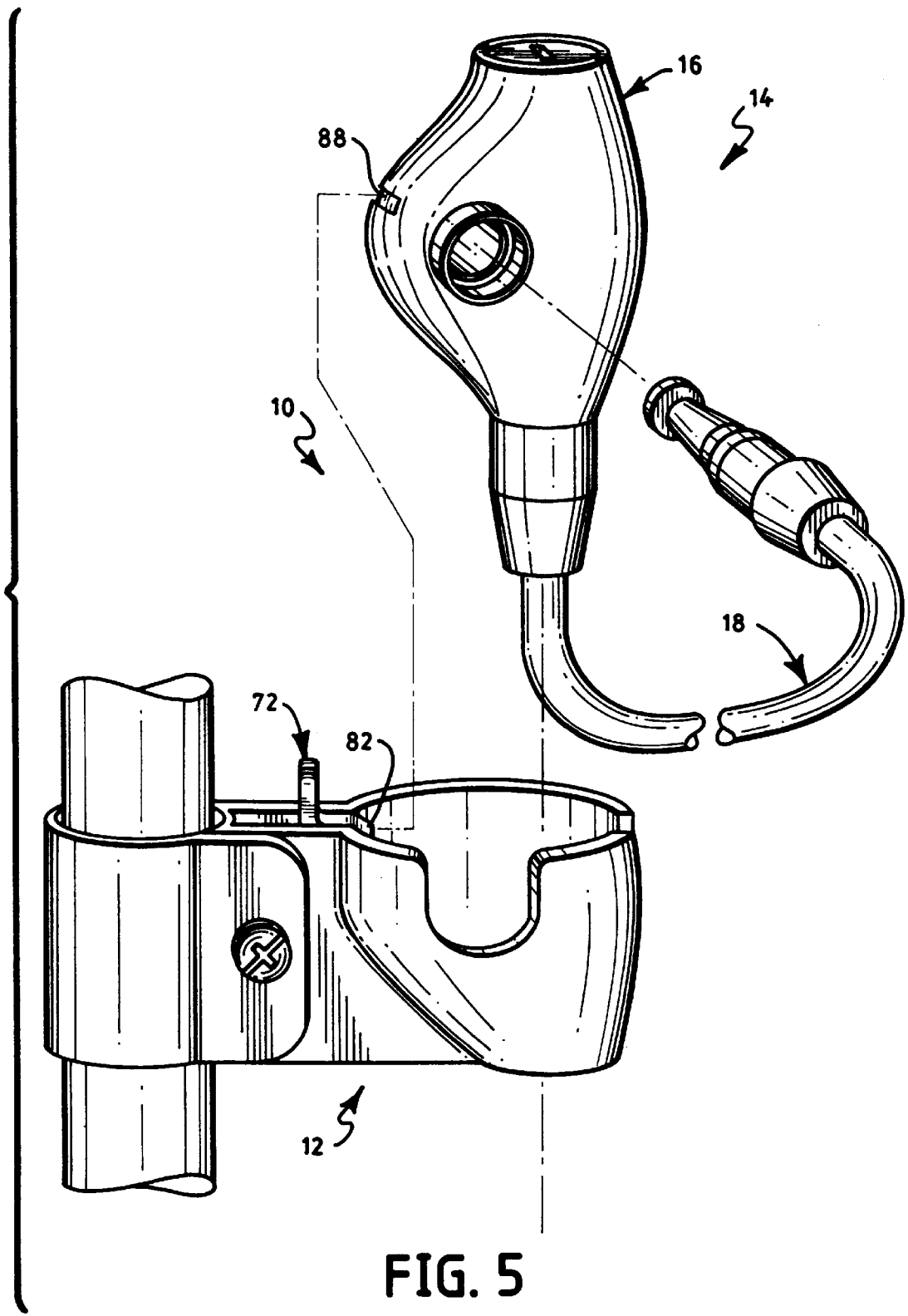
FIG. 5 is a perspective view of the bracket of the present invention including an optional releasable latch.

Optionally, the seat 32 has a latch for securing the lock head 16 into the cavity 60, as shown in FIGS. 5 and 6. The latch precludes the need for gravity to hold the lock head 16 in the cavity 60, so that various orientations of the bracket 12 are possible. The latch includes an arm 72 in four sections. The lower end of the spring section 74 is anchored to the bracket 12, as at 76. Extending at about 90° from the upper end of the spring section 74 is an offset section 78, which offsets the knob section 80 from the spring section 74. Extending in the opposite direction from the offset section 78 is a tongue 82.

The arm 72 is positioned so that it can flex between a latched position and an unlatched position. In the latched position, the tongue 82 extends into the cavity 60. In the unlatched position, the tongue 82 does not extend into the cavity 60. The spring section 74 biases the arm 72 to the latched position, so that manual force is needed to move the arm 72 to the unlatched position. When the manual force is removed, the arm 72 returns to the latched position.

When the lock head 16 is within the cavity 60, the tongue 82 fits into a groove 88 in the lock head 16. The upper surface of the tongue 82 is curved downwardly, as at 84, so that the arm 72 is pushed out of the way when the lock head 16 is being inserted into the cavity 60. When the lock head 16 is fully inserted into the cavity 60 and the tongue 82 is aligned with the groove 88, the arm 72 snaps back so that the tongue 82 is in the groove 88. The lower surface of the tongue 82 and the lower surface of the groove 88 are flat so that the lock head 16 cannot be pulled from the cavity 60. The lock head 16 is removed from the cavity 60 by manually pulling back on the knob 80 so that the tongue 82 comes out of the groove 88, and then pulling the lock head 16 from the cavity 60.

The arm 72 can be located anywhere around the circumference of the seat 32. Most preferably, however, it is located in the section of the seat nearest the attachment 30. This gives the most support and protection to the arm 72. Because the arm 72 has a protruding knob 80 and is somewhat flexible, it would be vulnerable to having an external object catch on it and snap it off if not protected.

Preferably, the bracket 12 is composed of a rigid plastic, such as ABS, nylon 6/6, or glass-filled nylon 6/6.

Thus it has been shown and described a cable lock and bracket which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A cable lock and bracket system for securely holding a cable lock on a strut of a cycle frame, said system comprising:
   (a) a cable lock having a lock head and a cable permanently extending therefrom, a free end of said cable being releasably attachable to said lock head;
   (b) a bracket having an attachment at one end and a seat at the other end;
   (c) said attachment being adapted to securely attach said bracket to said strut;
   (d) said seat having a cavity for reception of said lock head, said cavity including a wall, a top opening, and a bottom opening, and a stop for limiting relative motion between said lock head and said bracket; and
   (e) said seat having a gap in said wall, said gap extending from said top opening to said bottom opening and having a width adapted to allow said cable to pass through but prevent said lock head from passing through, and being shaped to allow said lock head to be received in said cavity and to be removed from said cavity while said cable free end is attached to said lock head.

2. The system of claim 1 wherein said cavity is generally funnel shaped with said bottom opening being smaller than said top opening, the size difference between said openings acting as said stop.

3. The system of claim 1 wherein said lock head is adapted to fit snuggly into said cavity.

4. The system of claim 1 wherein said bracket includes a latch for preventing separation of said lock head from said bracket without manual intervention.

5. The system of claim 4 wherein said latch includes a tongue on said bracket and a groove in said lock head, said tongue being adapted for movement between a latched position in which said tongue extends into said groove and an unlatched position in which said tongue does not extend into said groove, and having a spring for biasing said tongue into said latched position and for permitting manual movement to said unlatched position.

6. The system of claim 5 wherein said spring is an arm, a first end of said arm being fixedly attached to said bracket, said tongue extending from said arm near a second end thereof, said second end being free for manual movement between said latched position and said unlatched position.

7. A cable lock and bracket system for securely holding a cable lock on a strut of a cycle frame, said system comprising:

(a) a cable lock having a lock head and a cable permanently extending therefrom, a free end of said cable being releasably attachable to said lock head;

(b) a bracket having an attachment at one end and a seat at the other end;

(c) said attachment being adapted to securely attach said bracket to said strut;

(d) said seat having a cavity for reception of said lock head, said cavity including a wall, a top opening, and a bottom opening smaller than said top opening, and the size difference between said openings acting as a stop for limiting relative motion between said lock head and said bracket; and (e) said seat having a gap in said wall, said gap extending from said top opening to said bottom opening and having a width adapted to allow said cable to pass through but prevent said lock head from passing through, and being shaped to allow said lock head to be received in said cavity and to be removed from said cavity while said cable free end is attached to said lock head.

8. The system of claim 7 wherein said lock head is adapted to fit snuggly into said cavity.

9. The system of claim 7 wherein said system includes a latch for preventing separation of said lock head from said bracket without manual intervention, said latch including a tongue on said bracket and a groove in said lock head, said tongue being adapted for movement between a latched position in which said tongue extends into said groove and an unlatched position in which said tongue does not extend into said groove, and having a spring for biasing said tongue into said latched position and for permitting manual movement to said unlatched position.

10. The system of claim 9 wherein said spring is an arm, a first end of said arm being fixedly attached to said bracket, said tongue extending from said arm near a second end thereof, said second end being free for manual movement between said latched position and said unlatched position.

* * * * *